US009235646B2

(12) United States Patent
Kapur et al.

(10) Patent No.: US 9,235,646 B2
(45) Date of Patent: Jan. 12, 2016

(54) METHOD AND SYSTEM FOR A SEARCH ENGINE FOR USER GENERATED CONTENT (UGC)

(75) Inventors: Shyam Kapur, Sunnyvale, CA (US); Anesh S. Madapoosi, Sunnyvale, CA (US); Gregory C Martin, Boulder Creek, CA (US)

(73) Assignee: TIP TOP TECHNOLOGIES, INC., Sunnyvale, CA (US)

( * ) Notice: Subject to any disclaimer, the term of this patent is extended or adjusted under 35 U.S.C. 154(b) by 381 days.

(21) Appl. No.: 12/790,332

(22) Filed: May 28, 2010

(65) Prior Publication Data

US 2010/0306192 A1 Dec. 2, 2010

Related U.S. Application Data

(60) Provisional application No. 61/182,051, filed on May 28, 2009.

(51) Int. Cl.
G06F 7/00 (2006.01)
G06F 17/30 (2006.01)

(52) U.S. Cl.
CPC .............................. *G06F 17/30867* (2013.01)

(58) Field of Classification Search
CPC .............. G06F 17/30; G06F 17/30643; G06F 17/30002; G06F 17/30867; G06F 17/30038; G06F 17/2775
USPC ................................................. 707/723, 737
See application file for complete search history.

(56) References Cited

U.S. PATENT DOCUMENTS

| | | | |
|---|---|---|---|
| 7,911,635 B2 * | 3/2011 | Kimura ........................ 358/1.15 |
| 7,958,127 B2 * | 6/2011 | Edmonds et al. ............. 707/748 |
| 7,987,169 B2 * | 7/2011 | Epstein ......................... 707/706 |
| 8,005,826 B1 * | 8/2011 | Sahami et al. ................ 707/723 |
| 8,799,773 B2 * | 8/2014 | Reis et al. ..................... 715/254 |
| 2001/0023401 A1 * | 9/2001 | Weishut et al. .................... 705/1 |
| 2008/0133488 A1 * | 6/2008 | Bandaru et al. ................... 707/3 |
| 2009/0222551 A1 * | 9/2009 | Neely et al. ................... 709/224 |
| 2009/0240564 A1 * | 9/2009 | Boerries et al. ................ 705/10 |
| 2009/0249451 A1 * | 10/2009 | Su et al. ............................ 726/5 |
| 2009/0271391 A1 * | 10/2009 | Kawale et al. .................... 707/5 |
| 2009/0282019 A1 * | 11/2009 | Galitsky et al. ................... 707/5 |
| 2010/0145777 A1 * | 6/2010 | Ghosh et al. ................. 705/14.1 |
| 2010/0223261 A1 * | 9/2010 | Sarkar .......................... 707/726 |
| 2010/0241507 A1 * | 9/2010 | Quinn et al. ............... 705/14.42 |

* cited by examiner

*Primary Examiner* — Azam Cheema
(74) *Attorney, Agent, or Firm* — Orrick, Herrington & Sutcliffe, LLP

(57) ABSTRACT

A method and system for a search engine for user generated content have been disclosed. According to one embodiment, a computer implemented method comprises receiving a search request from a client, the search request directed to user generated content. Relevant user generated content is retrieved, wherein retrieving comprises searching processed user generated content, and wherein processing user generated content comprises receiving first input data including text, creating a substring of text from the first input data and categorizing the substring to produce a concept associated with the substring, wherein the substring is categorized according to one of dictionaries or pattern analysis. An indication of sentiment is assigned to the concept associated with the substring and an indication of influence is assigned to the concept associated with the substring. The relevant user generated content is displayed.

6 Claims, 7 Drawing Sheets

METHOD AND SYSTEM FOR A SEARCH ENGINE FOR USER GENERATED CONTENT (UGC)

The present application claims the benefit of and priority to U.S. Provisional Patent Application No. 61/182,051 entitled "METHOD AND SYSTEM FOR A SEARCH ENGINE FOR USER GENERATED CONTENT (UGC)" filed on May 28, 2009, and is hereby incorporated by reference.

FIELD

The field of the invention relates generally to computer systems. In particular, the present invention is directed to a method and system for a search engine for user generated content.

BACKGROUND

Currently there are more than 80 million creators of user generated content (UGC) on the web. Users are drawn to UGC sites because the content is informative and practical, helps them make decisions, and appears to be written by "normal people like me." While UGC content provides users with great information, it is challenging to properly and efficiently search, discover, and utilize the information to make decisions. In other words, UGC is informative but hard to use. UGC search experiences are plagued by the following problems:

Too literal and absent of "meaning." A search on Google for "great Italian San Francisco" results in direct matches on the words "great Italian," etc. Pages that contain "excellent Italian" do not appear.

Yield single data points. A search on Google for "best dish at Fuki Sushi" results in various matches on Fuki Sushi. There might be a match on "best dish." However, a user wants an aggregate view of the best dish—not a bunch of noise among which the best individual matches are found. Furthermore, the user needs to see that aggregate view in context, relative to all other aggregate views of the best dishes at that restaurant. For example, an ideal result might be "Here is the best dish, and the next sets of dishes ordered best to worst . . . and this data is sourced from more than 100 opinions from across the web."

Too many reviews. Vertical sites such as Yelp (a services UGC site) or TripAdvisor (a travel UGC site) often have thousands of reviews about any one thing, and they are useful when they are read. But, the user is faced with reading all the reviews, a time-consuming and frustrating process. Reviews have a "star system" but the higher the number of reviews, the less useful it is, since as the number of opinions rises, most stats converge at 3 to 5 stars. This does not provide any additional information to the user.

Undiscovered treasures. Reviews are a goldmine of information. Not just in terms of what the opinion is but also in terms of what additional items relate to the main item. For example, a TripAdvisor review on Grand Cayman might have people's opinions of that destination. But there will also be additional nuggets of information regarding what to do and where to go while at Grand Cayman.

SUMMARY

A method and system for a search engine for user generated content have been disclosed. According to one embodiment, a computer implemented method comprises receiving a search request from a client, the search request directed to user generated content. Relevant user generated content is retrieved, wherein retrieving comprises searching processed user generated content, and wherein processing user generated content comprises receiving first input data including text, creating a substring of text from the first input data and categorizing the substring to produce a concept associated with the substring, wherein the substring is categorized according to one of dictionaries or pattern analysis. An indication of sentiment is assigned to the concept associated with the substring and an indication of influence is assigned to the concept associated with the substring. The relevant user generated content is displayed.

The above and other preferred features, including various novel details of implementation and combination of elements, will now be more particularly described with reference to the accompanying drawings and pointed out in the claims. It will be understood that the particular methods and implementations described herein are shown by way of illustration only and not as limitations. As will be understood by those skilled in the art, the principles and features described herein may be employed in various and numerous embodiments without departing from the scope of the invention.

BRIEF DESCRIPTION

The accompanying drawings, which are included as part of the present specification, illustrate the presently preferred embodiment and together with the general description given above and the detailed description of the preferred embodiment given below serve to explain and teach the principles of the present invention.

Figure 1:
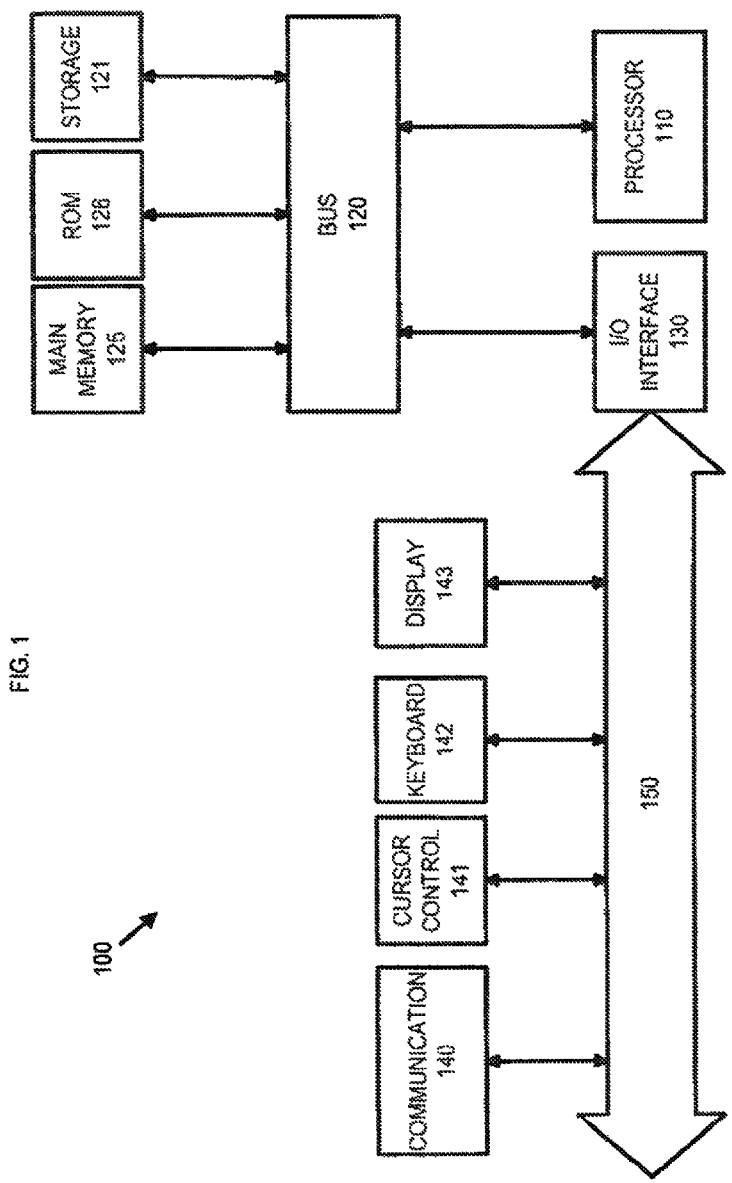
FIG. 1 illustrates an exemplary computer architecture for use with the present system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A method and system for a search engine for user generated content have been disclosed. According to one embodiment, a computer implemented method comprises receiving a search request from a client, the search request directed to user generated content. Relevant user generated content is retrieved, wherein retrieving comprises searching processed user generated content, and wherein processing user generated content comprises receiving first input data including text, creating a substring of text from the first input data and categorizing the substring to produce a concept associated with the substring, wherein the substring is categorized according to one of dictionaries or pattern analysis. An indication of sentiment is assigned to the concept associated with the substring and an indication of influence is assigned to the concept associated with the substring. The relevant user generated content is displayed.

The present system provides search and discovery across all domains of human interest. It uses the best of what technology can do together with what humans are best at doing. It then guarantees to provide the best possible answer to any human need no matter whether it is expressed implicitly or explicitly.

According to one embodiment, input to the present engine can be structured or unstructured data. The data might be input into the engine beforehand or in real time at the time the user inputs a specific request. In either case, the engine processes the data in the following way:

It teases out any meta-data that is attached to the content and records this in some suitable format in a database or another storage mechanism.

It breaks up the content into smaller logical chunks as needed. For example, if the data is a corpus of e-mails, the smaller chunks could be individual e-mails.

Each piece of content is parsed. All words and phrases are categorized into a large number of pre-defined categories. These categories may or may not be organized into multi-level hierarchies. A single word or phrase that is categorized is referred to as a concept. A single concept might be classified into one or more categories. A normalized form of the concept might also be returned. Parsing is quite a complex process that involves use of a combination of all of the following things:

Data dictionaries of various sizes that are built up as needed. Some of these are built from the data processed automatically.

A catalog of rules that help to classify words and phrases into appropriate categories.

A catalog of mapping rules that convert, when appropriate, the classification of a concept into one category into classification into another category. Some of these are built from the data processed automatically.

A variety of linguistic patterns are leveraged to help identify what concepts words and phrases might correspond to. Stemming rules are an example of linguistic patterns that are leveraged.

The output of the parsing in is a rich knowledge structure. This knowledge can be represented in a variety of ways including in the form of a file with concepts tagged by the categories as well as the corresponding normalized forms.

The basic parsed output can be processed further to generate additional knowledge structures. Only a few examples are mentioned below for illustration: Parsed output is processed to generate statistics on how often different categories or concepts appear in the content. We may process the basic parsed output to discover the sentiment attached to any concept or groups of concepts or categories. In order to do this well, we have designed algorithms that are optimized to accurately determine what sentiment attaches to which entity.

The data processed through the present engine gets enriched as described above. The knowledge thus created enables a wide variety of rich semantic applications. By processing a variety of data related to any particular entity, the quality of that entity can be evaluated along any of an infinite number of dimensions. For example, suppose the data processed is about experiences of patrons of dining establishments as expressed by them in both structured (e.g., star ratings) and unstructured (e.g., review written in free text) form. Quality of establishment is evaluated with regard to any attribute. Attributes can include ambiance, quality of all or specific dishes, or value for money. In fact, any attributes are supported including attributes that the user enters in real-time. The important attributes that influence decision-making in any category of human interest can also be inferred automatically from analysis of the data.

According to one embodiment, the present system includes an intuitive user interface powered by a powerful semantic engine and storage model. The present system indexes multiple verticals (restaurant reviews, travel reviews, product reviews, wine reviews, movie reviews, and many more), plus all head, torso, and potentially tail sites in each vertical. The present system returns results that are specific to each user's tastes. The present system performs the following on the indexed body of content:

Understand and normalize all subjective language, such as opinion, mood, sentiment, etc. E.g. "I loved", "stay away from", "definitely worthwhile."

Aggregate multiple opinions and present them in a normalized summary. While different people might express their opinion on the same item in slightly different ways, the present System properly summarizes the results.

Directly understand or infer all objective entities (the name of a movie, of a restaurant, of a dish, of a wine, of a product, of travel destination).

Provide a multidimensional search and browse interface to each bit of content. E.g. given the name of a restaurant, be able to rank its dishes, its ambience, and its price relative to other restaurants of the same cuisine.

Provide personalized results based on the user's personal data received from various sources, including direct input.

According to one embodiment, the present system includes an index of the source data, a process and toolset to vet the quality of the content (to be defined), a semantic search engine over the data, a set of front-ends that use the present search web services to harness the data, capabilities of the search engine such as advanced personalization, and multiple user interface modalities.

User Interface

According to one embodiment, a user interface for use with the present system includes a hub interface, in-depth coverage interface, search interfaces, a text message module, an interaction module, a finance interface, a shopping interface, and widgets.

A hub interface, according to one embodiment, includes the following.

Search Box auto-complete features cool queries & real-time trend queries. After a user types just a few letters in the search box, real-time query suggestions start to appear. Through analysis of a variety of relevant data, the most likely user needs at that time are anticipated.

A "To: Host From: Host" module features messages showcasing uses and user responses to the host's products and services. A "Tip Off" button is used to alert users that their message is featured in this showcase.

Wall of Fame: is an image gallery and text message archive of all content featured in the "To: Host From: Host" module.

An in-depth coverage interface, according to one embodiment, illustrates how the present system's semantic technology can extract insights from social media, measure topical sentiment trends & aggregate real-time Web content in a meaningful way based upon people's natural language expression found in tweets and social networking platforms like Twitter. Sentiment polling charts measure trends effectively and accurately for any current topic, subject or event. The present system also provides positive messages, negative messages & top web pages to help determine why the positive or negative sentiment was the way it was at any moment in time. Examples of in-depth coverage include the following.

Sentiment Polling Trends: "Sentiment Trends for President Obama" Trend analysis of real-time social media as a predictive indicator is an active area of research into the relationship of sentiment trends and financial markets, consumer shopping patterns, election results, etc.

Positive messages & negative messages Leaderboard Trends: "Academy Award Trends"—The present system uses social media data to predict the Academy Award winners based upon the sentiment analysis of millions of tweets related to the Oscar nominees.

Positive message & negative message Sentiment Scores: "2010 Winter Olympics: Vancouver Games"—The present system integrates social media search results into the interactive "Athletes & Team" interface, displaying the most active Olympic athletes on Twitter with corresponding Positive message & negative message sentiment scores. Clicking on an athlete's name provides detailed search results.

Holiday Event Specials: "2009 Holiday Gift Guide"—The present system understands each and every tweet just like a human being would. As a result, it can discover from within the tweets exactly what gifts people want or are planning to buy this holiday season. The present search algorithm also analyzes the sentiment around each of these wish list items to extract the positive and negative things people are saying about them. Once collected, updated periodically and aggregated across individual tweets, this knowledge is presented in several different ways in a 2009 Holiday Gift Guide. Holiday activity and travel related results are classified into a number of natural categories like top US cities and international destinations along with where people are planning to stay and the popular activities planned. Besides frequency for ranking, a sentiment pie chart is included indicating the percent of positive messages, negative messages and neutral statements associated with each topic listed. In the concept clouds for gifts and travel activity related topics, the popularity scores and sentiment associated with each topic search results set is computed and reported by estimating the sentiment expressed in each of the corresponding tweets obtained from Twitter's API feeds.

According to one embodiment, search interfaces of the present system determine what is currently being said about entered search terms and delivers more relevant results. Search interfaces include the following, according to one embodiment.

Search Suggestions: In the "Search for Positive messages" module, the search engine offers suggestions as to how your query can be modified to get even more focused results. These suggestions are also derived in real-time. For example, for the query "sharks" in the context of the NHL playoffs, the suggestions might be a query involving the terms "game", "san jose" and "hockey" in addition to "sharks".

Sentiment Trends module displays a chart with the proportion of positive, negative & neutral messages for the query over time. Move the slider below the chart to see search result messages for that trend period. The impact of events on the public's impression or attitude toward an idea, person, company or brand can easily be monitored using search results and sentiment trend charts.

Concept Cloud module displays real-time topics in messages matching the search query. Clicking a topic will filter the search results, displaying only the Positive messages, Negative messages and Neither messages for the original query containing the sub-topic.

L8st tweets & Gr8st tweets modules showcase the most recent & also the best tweets, respectively, for the query.

The best text messages are grouped into positive messages, negative messages & neutral messages ranked by relevancy to user's search keywords. "Positive messages" are the messages that express something positive about the search term, like a favorable comment about the person's new cell phone. "Negative messages" express a negative sentiment related to the search term, such as a warning not to go see an awful movie. Messages that appear in the "Neither" column may include polls, advertisements or factual information.

According to one embodiment, a text messages module features includes: user image, text highlighting, short URL expansion, message response functionality (I Like, Retweet, Reply, Forward).

Additional user interface features include a related content column. Content is highlighted related to an entered search.

Interaction tools: Share related content with others via the "I like" button:

Top people on Twitter: displays influencers related to the query based upon message quality and user interaction.

Top products in Shopping: displays sample product results related to the query. In the current embodiment, the products are selected from the entire Amazon.com web site. Reviews on that site are analyzed through the present semantic engine.

Top interfaces on the Web: This module displays current & popular related web links (websites, news & media). In general, the links that appear after a green bullet come from Positive message results, while those that appear after a red bullet come from the negative messages results.

According to one embodiment, an interaction module offers additional tools embedded in the search results to connect with people:

Embed: allows users to add a search widget to a blog or Web interface for a standing query.

Add this: allows users to share the search results interface via Twitter, Facebook, Email, etc.

Add to Browser: allows users to add search functionality to a browser's search option menu.

Invite a Friend: allows users to send friends an introduction to the present system application.

Add these positive messages to a Channel: allows users to quickly compare search results for different queries on a single vertical-focused channel of the present system.

Add your positive message below via Twitter: allows users to quickly post a message related to the search query.

According to one embodiment, a finance interface provides social media perspective, earnings sentiment, and real-time search results for public companies year round. A quarterly earnings calendar lists daily company earnings reports, corporate sentiment trends, and advanced finance search results via the ticker symbol. Finance specific search results interfaces with the ability to toggle between regular search results and finance only search results.

According to one embodiment, a shopping interface offers consumers a end-to-end comparison shopping experience with the best product reviews, summaries and ratings along with product comparison across various decision-making product attributes, specific items and product lines. Product profile summary interfaces with ratings & reviews are included. The present system analyzes user-generated product reviews from Amazon.com and provides product ratings & percentile scores exclusively from these reviews across a variety of attributes such as Overall Quality, Features, Safety, Value for Money, as well as the related product reviews grouped into positive messages & negative messages. The present system provides an interactive comparison shopping grid & checkout cart that allows a user to quickly compare & sort multiple products, ratings & prices before purchasing, easily organize a shopping list in one place & make informed decisions about desired items, get relevant product reviews & real-time positive messages from real consumers all on one interface, and view real-time product opinions via a widget. The widget includes pie charts displaying the overall sentiment related to the keyword search, the latest Positive message and negative message tweets related to the product, and the topical buzz associated with the search results.

Widgets, according to one embodiment of the present system, can be embedded in a blog or website using a provided widget wizard. Widgets are customizable for any term or group of words & can be personalized to match the interface they appear in. Once customized, the widget code is emailed for the user to embed any one of a variety of widgets. Examples of widgets include but are not limited to top positive and negative message and authors for the specified search term, the percentage of positive and negative sentiment being written about the specified search term, the related topics people are writing about related to the search term specified, the top web interfaces related to the search term specified, and all of the above.

Channels, according to one embodiment of the present system, are subject specific interfaces for the most popular search categories, such as People, News, Movies, Music and Travel. Users can see what other users have most recently searched on within that subject area, compare the percentage of positive and negative sentiment for each term users have searched, and click on a term listed in the grid to see search results, browse the messages, and share thoughts.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. A method is here, and generally, conceived to be a self-consistent process leading to a desired result. The process involves physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the method and system as described herein.

FIG. 1 illustrates an exemplary computer architecture for use with the present system, according to one embodiment. One embodiment of architecture 100 comprises a system bus 120 for communicating information, and a processor 110 coupled to bus 120 for processing information. Architecture 100 further comprises a random access memory (RAM) or other dynamic storage device 125 (referred to herein as main memory), coupled to bus 120 for storing information and instructions to be executed by processor 110. Main memory 125 also may be used for storing temporary variables or other intermediate information during execution of instructions by processor 110. Architecture 100 also may include a read only memory (ROM) and/or other static storage device 126 coupled to bus 120 for storing static information and instructions used by processor 110.

A data storage device 125 such as a magnetic disk or optical disc and its corresponding drive may also be coupled to computer system 100 for storing information and instructions. Architecture 100 can also be coupled to a second I/O bus 150 via an I/O interface 130. A plurality of I/O devices may be coupled to I/O bus 150, including a display device 143, an input device (e.g., an alphanumeric input device 142 and/or a cursor control device 141).

The communication device 140 allows for access to other computers (servers or clients) via a network. The communication device 140 may comprise one or more modems, network interface cards, wireless network interfaces or other well known interface devices, such as those used for coupling to Ethernet, token ring, or other types of networks.

Figure 2A:
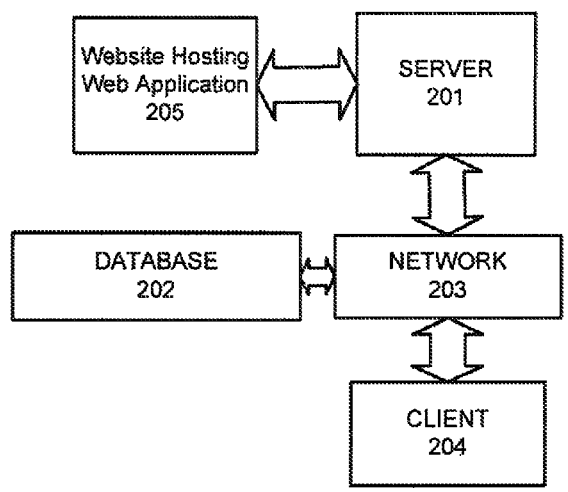
FIG. 2A illustrates an exemplary web application system diagram for use with the present system, according to one embodiment.

FIG. 2A illustrates an exemplary web application system diagram for use with the present system, according to one embodiment. A server 201 hosting a website 205 is in communication with a network 203. A database 202 and a client system 204 are in communication with the network 203. The website 205 is hosting a web application according to the present system. The website 205 includes a main interface, a results interface, a drill down interface, and a personal profile interface, according to one embodiment.

Figure 2B:
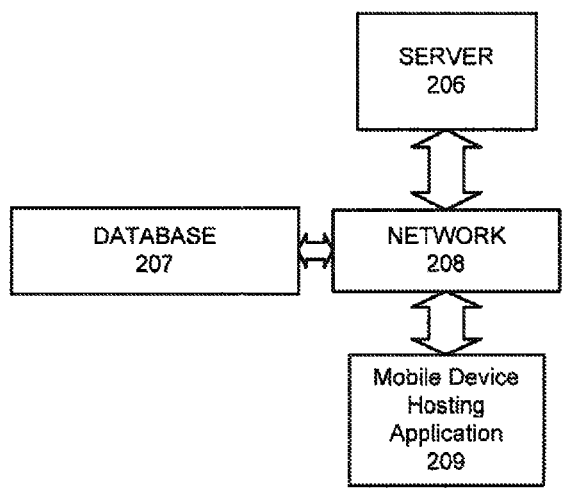
FIG. 2B illustrates an exemplary mobile device application system diagram for use with the present system, according to one embodiment.

FIG. 2B illustrates an exemplary mobile device application system diagram for use with the present system, according to one embodiment. A server 206 is in communication with a network 208. A database 207 and a client mobile device system 209 are in communication with the network 208. The client mobile device system 209 is hosting an application according to the present system. Examples of the client mobile device system 209 include but are not limited to smartphones (e.g. Apple iPhone). The application residing on the client mobile device system 209 includes a main interface, a results interface, a drill down interface, and a personal profile interface, according to one embodiment.

According to one embodiment, the present system automatically determines whether a user agent is a web browser or a mobile device application and properly renders the contents. Certain user interface constraints are made to account for smaller screen size of a mobile device.

Figure 3:
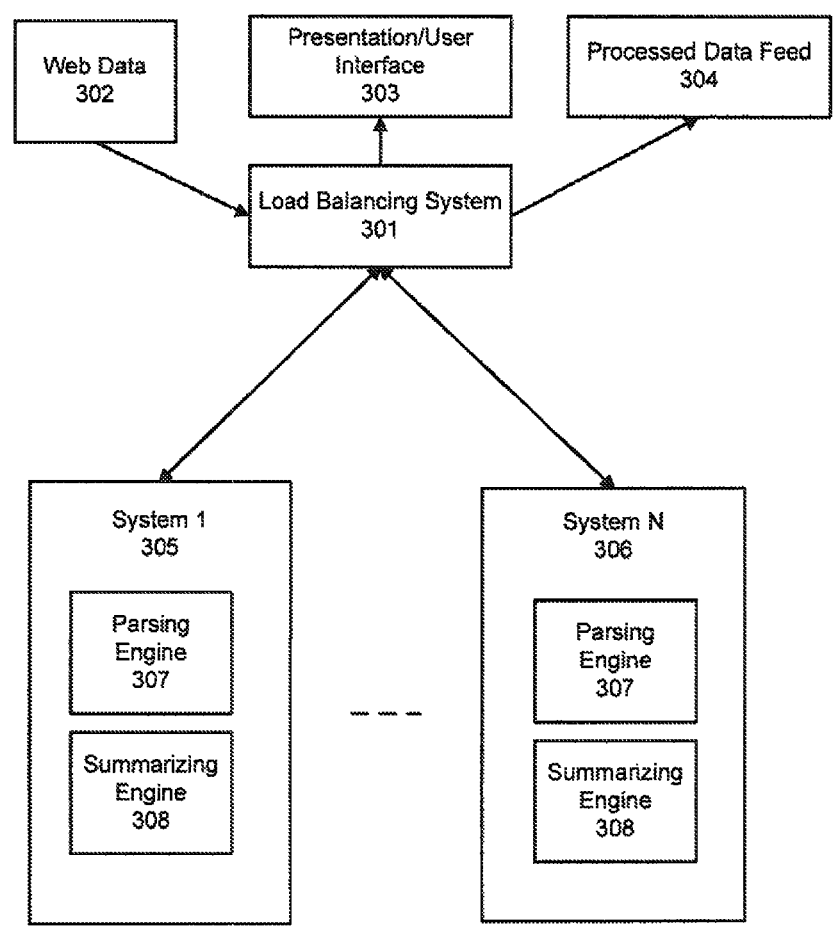
FIG. 3 illustrates an exemplary application architecture for use with the present system, according to one embodiment.

FIG. 3 illustrates an exemplary application architecture for use with the present system, according to one embodiment. A load balancing system 301 receives as input web data 302. Examples of web data 302 include but are not limited to Twitter data, Amazon data, and FTP data. The load balancing system 301 provides data to build a presentation or user interface 303. The user interface 303, as described above in FIGS. 2A and 2B, can be on a mobile device or a web application. The load balancing system 301 also provides data to a processed data feed 304. The load balancing system 301 communicates with one or more systems (here shown as System 1 305 through System N 306) to process and manipulate the received web data 302. Each system (305, 306) includes a parsing engine 307 and a summarizing engine 308. Exemplary functionality of the parsing engine 307 and summarizing engine 308 are explained in FIGS. 5 and 6, respectively.

Figure 4:
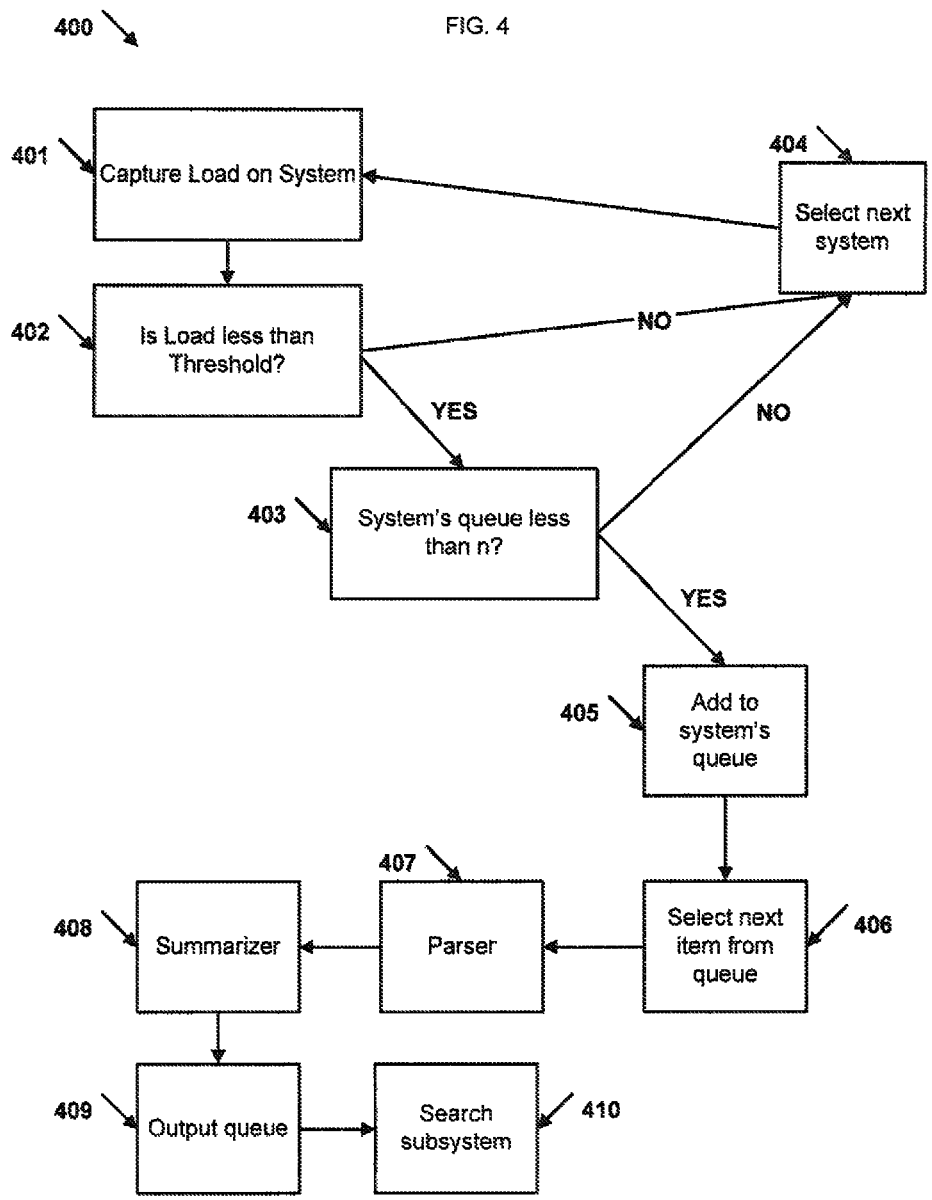
FIG. 4 illustrates an exemplary load balancing process for use with the present system, according to one embodiment.

FIG. 4 illustrates an exemplary load balancing process for use with the present system, according to one embodiment. An exemplary load balancing process 400 begins with capturing the load on a system 401. The load is examined to determine whether the load is less than a defined threshold 402. If the load is above the set threshold then a new system is selected 404. If the load is below the set threshold, then the system's queue is examined to determine whether it is less than a defined limit of 'n' 403. If the queue is not less than 'n', a new system is selected 404. If the system's queue is less than 'n', an item is added to the queue 405. A next item is selected from the queue 406, and processed through the parser 407 and summarizer 408. Parsed data is scheduled into the output queue 409, and provided to the search subsystem 410.

Figure 5:
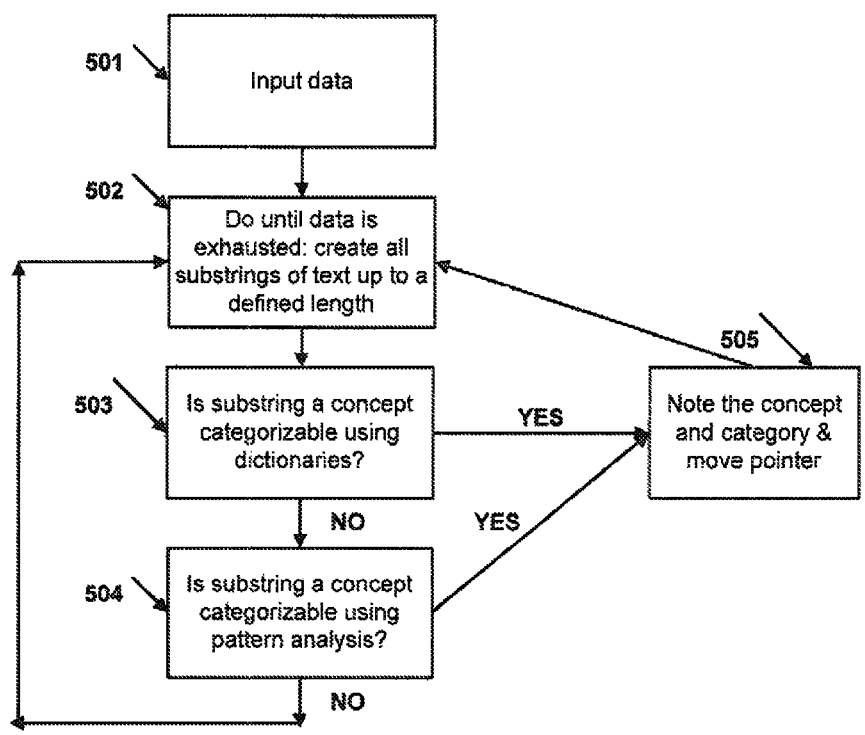
FIG. 5 illustrates an exemplary parsing engine process for use with the present system, according to one embodiment.

FIG. 5 illustrates an exemplary parsing engine process for use with the present system, according to one embodiment. An exemplary parsing engine process 500 begins with receiving input data 501 and creating all substrings of text up to a defined length (e.g. 10 words or less) 502. A substring is tested to determine whether the concept of the substring is categorizable using dictionaries 503. If so, the concept and category are logged and the pointer is advanced 505. If not, the substring is tested to determine whether the concept of the substring is categorizable using pattern analysis 504. If so, the concept and category are logged and the pointer is advanced 505. If not, the engine returns to 502 to create another substring.

Figure 6:
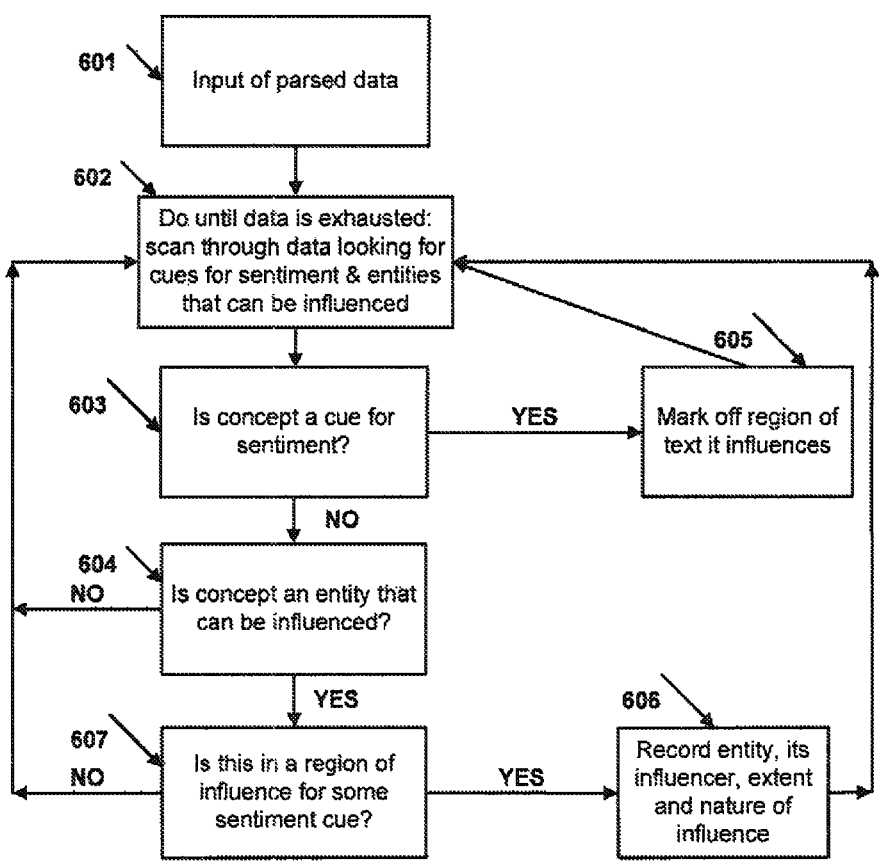
FIG. 6 illustrates an exemplary summarizing engine process for use with the present system, according to one embodiment.

FIG. 6 illustrates an exemplary summarizing engine process for use with the present system, according to one embodiment. An exemplary summarizing engine process 600 begins with receiving parsed input data 601. The data is then scanned for cues for sentiment and entities that can be influenced 602. A concept is then tested to determine whether it is a cue for sentiment 603. If so, the region of text influenced by the concept is marked off 605. If not, the concept is tested to determine whether it is an entity that can be influenced 604. If it is not an entity that can be influenced, another concept is selected 602. If it is an entity that can be influenced, the concept is tested to determine whether it is in a region of influence for a sentiment cue. If not, another concept is selected 602. If so, the entity, its influencer, and the nature and extent of influence are recorded 606 and another concept is selected 602.

Figure 7:
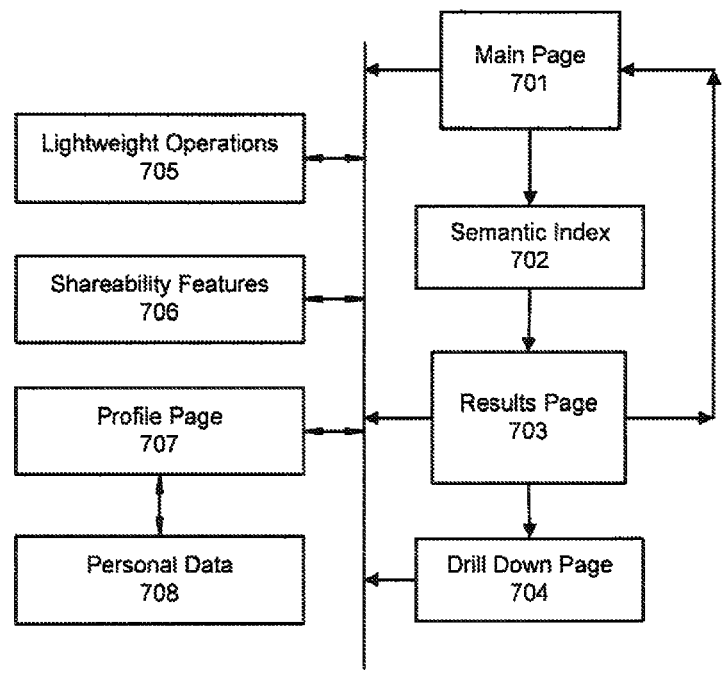
FIG. 7 illustrates an exemplary site map for use with the present system, according to one embodiment.

FIG. 7 illustrates an exemplary site map for use with the present system, according to one embodiment. A main interface 701 is in communication with a semantic index 702 that provides data to a results interface 703. The results interface 703 may return to the main interface 701. From the results interface 703 a user may navigate to a drill down interface 704 and then return to the main interface 701. The main interface 701, results interface 703, and drill down interface 704 are in communication with lightweight operations 705, shareability features 706, and a profile interface 707. The profile interface 707 has access to personal data 708. Table 1 highlights exemplary features of the interfaces.

TABLE 1

Exemplary interface descriptions.

| # | Item | Options | Personalization |
|---|------|---------|-----------------|
| 1 | Main Page | Home Page. User can: Search Login or Register Share site with a friend Do other basic functions through links | Non-personalized: basic search interface Personalized: Shows username, and provides recent searches |
| 2 | Semantic Index | Not visible to user. Stores all crawled and parsed data. See below for detail. | N/A |
| 3 | Results Page | Results that display after search. User can: View different dimensions of results Drill down on results Take action on various results. E.g. share individual items Link to other pages | Non-personalized: Sees search results Personalized: Can choose to see filtered (default) and non-filtered results Can take action such as save to favorites |
| 4 | Drill down page | Page shown when user drills down in results page. User can: See main opinions about an item. Opinions are linked to source Take action on various results. E.g. share individual items Link to other pages | Non-personalized: Basic drill down interface Personalized: Shows username, and provides recent searches Can take action such as save to favorites |
| 5 | Profile Page | Page shows user preferences. In addition to "My account" info, this page has two modes of personalization: Direct input: words that describe the user (e.g. vegetarian) Indirect input: e.g. feeds, Facebook account data. | N/A |

TABLE 1-continued

Exemplary interface descriptions.

| # | Item | Options | Personalization |
|---|------|---------|-----------------|
| 6 | Personal Data | All personal data is stored until the account is terminated. | N/A |
| 7 | Shareability Features | 2 Types: Ability to share the site with people on Facebook, Delicious, etc Ability to share an item with others (including self) | Non-personalized: Sharing site with people Personalized: Sharing site with people Sharing items with others |
| 8 | Lightweight operations | Miscellaneous items such as: Registering subsystem Forgot password About page | |

According to one embodiment, a user explicitly enters a location, or user is logged in and a location is implied. At the main page, an input query supports the following:

Location: Users specify their location (dynamically or in their profile). For now, if no location is provided then a default location is used.

Cuisine type: Examples include but are not limited to Italian, Vietnamese, Indian, Japanese.

Restaurant name: e.g. Fuki Sushi, Cascal. If more than one restaurant matches, then the system asks the user to select the intended restaurant.

Specific dish: e.g. Ravioli, Sushi. Support for compound dishes is included—e.g. Spaghetti Bolognese The Input query supports natural language, although the location has a separate input box, as shown in the figure. Sample queries include:

Italian|Palo Alto
Cascal|Mountain View
Sushi|Los Altos
Italian|Palo Alto
Cascal Mountain View
Sushi Los Altos
Spanish
Cascal
Sushi The last three cases result in whatever is the default location as specified above.

If a query is made and it is not recognized, then those items not recognized are retuned with a set of options to determine what the query type is. This elicits a response from the user and helps us add to our knowledge. Examples include:

User inputs "Sicilian." Response: is this a cuisine type, a restaurant, dish, or something else?

According to one embodiment, auto-lookup is supported. As the user types in the query, an Ajax call will be made to fill it out. E.g. "Su_" shows "Sushi" as an option. Pressing tab or enter, fills in the query.

According to one embodiment, the present semantic index consists of crawled, cleaned, parsed, and indexed content. Examples of data sources include but are not limited to Yelp, Zagat, CitySearch, OpenTable, Geo Specific Sites (e.g. NYMag), TripAdvisor.

According to one embodiment, a crawler has the ability to crawl the above sites, and in the future, expand to additional sites.

The crawler has the following capabilities:
Intelligence to understand the nuances of the structures of various sites.
Extract the review data and properly separate the data from the noise (advertisements, etc.)
Support target site APIs where they are available.
Be able to extract, de-dupe, and normalize metadata as follows:
    Name of restaurant
    Geography
    Cuisine
    Contact information
    Address The result of the crawler process is to store the data in a structured, pre-determine format on the server.

The present system has an appropriate storage model to allow it to scale to the following exemplary metrics: 2 Terabytes of review data, and 1 second response time for all searches.

According to one embodiment, semantic technology of the present system includes the following components:
A smart parser able to extract, summarize, and render subjective and objective data.
A personalization overlay shall enable a further filtering of all data to that user's preference.

According to one embodiment, the results page displays based on the input query. The results are presented as follows:
The query is re-printed, with some accentuation (e.g. bold, colored)
Several columns, whereby, each column is a tabulation, from best to worst of the results of the query across different dimensions mentioned above plus:
    Price Rating: e.g. cheap, expensive, fancy
    Service: e.g. Great, good, excellent
    Décor: e.g. Ambience, great ambience
A maximum of 10 items will be displayed in any list. If more than 10 items appear, then a link with " . . . show more . . . " is displayed. That list then provides the next set of items.
Since in a given list there might be various distances of separation in terms of quality between items, some type of demarcation is shown around similarly clustered results.
When a restaurant is displayed, 2 links are provided:
    A link to the Yelp (or in the future, appropriate source content, e.g. TripAdvisor)
    Drill down for more information (see table below)
Results displayed are included in table 2.

TABLE 2

Exemplary results displayed

| Given this input . . . | . . . the resulting dimensions are this (all ranked best to worst) | When clicked, the following is displayed |
|---|---|---|
| Restaurant name | Provide a list of Dishes best to worst. Provide a list of popular dishes. | Drilling down on a dish results in: Sample snippets by quality "Do's", e.g. I recommend the "filet" |
| Cuisine | Provide a list of Restaurant Names for these dimensions: service, décor, price, overall dishes | Drilling down on a restaurant name provides a "pattern" view for that restaurant as is shown in the row above. |

TABLE 2-continued

Exemplary results displayed

| Given this input . . . | . . . the resulting dimensions are this (all ranked best to worst) | When clicked, the following is displayed |
|---|---|---|
| Location | Provide a list of Restaurant Names (across all cuisines) for these dimensions: service, décor, price, overall dishes | Same as above. |
| Specific dish | Provide a list of Restaurant Names for these dimensions: overall dish quality, décor, price, overall dishes. (P2) Provide ability to choose restaurant based on all dimensions matching. | Same as above. |

According to one embodiment, the drill down page enables drilling down into a result from the results page. This feature offers the user a more in-depth view into the specific item. The detail provided is a set of specific comments that provide additional insight into the parent token. For example, if a dish is rated as "best dish," drilling down on that dish provides the user with highly qualified recommendations.

When a user comes to the destination site, the user is able to perform full searches as is described above.

If a user registers, then additional functionality is provided.

The user shall enter basic identity information: name, email, etc.

The user shall enter (optional) personalization options as follows: 1 or more terms that describes their dietary preferences. E.g. vegetarian, adventurous, carnivore. These terms shall provide more personalized search results According to one embodiment, two aspects of sharing are supported:

Sharing the system site with other people.

The user has the ability to share individual items with themselves or with others. There are situations when a user saves items they need for later consideration. Below are some use cases:

A restaurant is identified through the site and that restaurant name with its corresponding Yelp review needs to be shared with others.

A restaurant is identified and the recommended dishes are to be saved for review while at the restaurant.

A method and system for a search engine for user generated content have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A computer-implemented method, comprising:
receiving a search request from a client, the search request directed to user generated content;
retrieving relevant user generated content, wherein retrieving comprises searching processed user generated content, and wherein processing user generated content comprises
receiving first input data including text;
creating a substring of text from the first input data and categorizing the substring to produce a first concept associated with the substring, wherein the substring is categorized according to one of data dictionaries or pattern analysis;
creating data dictionaries, concept classification categories, and mapping rules for categorization by analyzing linguistic patterns in the substring of text;
assigning an indication of sentiment to the first concept associated with the substring by determining the nature of one or more secondary concepts in neighboring text and the ability of one or more secondary concepts to influence sentiment of the first concept;
assigning an indication of influence to the first concept associated with the substring by determining the nature of the one or more secondary concepts in neighboring text and the ability of one or more secondary concepts to have their sentiment influenced by the first concept; and
displaying the relevant user generated content based on the indication of sentiment and the indication of influence.

2. The computer-implemented method of claim 1, wherein a user evaluates the relevant user generated content.

3. The computer-implemented method of claim 1, wherein a user designates through an interface how the relevant user generated content is displayed.

4. The computer-implemented method of claim 1, wherein an indication of sentiment is one of positive, negative, or neutral.

5. The computer-implemented method of claim 1, wherein an indication of influence comprises a nature and an extent.

6. The computer-implemented method of claim 1, wherein a user shares the relevant user generated content.

* * * * *